(12) United States Patent
Cymbal et al.

(10) Patent No.: US 7,798,525 B2
(45) Date of Patent: Sep. 21, 2010

(54) COLLAPSIBLE STEERING COLUMN ASSEMBLY

(75) Inventors: William D. Cymbal, Freeland, MI (US); Melvin L. Tinnin, Clio, MI (US); Richard K. Riefe, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 179 days.

(21) Appl. No.: 12/101,488

(22) Filed: Apr. 11, 2008

(65) Prior Publication Data

US 2009/0256342 A1    Oct. 15, 2009

(51) Int. Cl.
B62D 1/19 (2006.01)
(52) U.S. Cl. .......................................... 280/777; 74/492
(58) Field of Classification Search .................. 280/777, 280/775; 74/492, 493, 496; 403/109.1, 109.3, 403/377; 464/162, 167, 169
See application file for complete search history.

(56) References Cited

U.S. PATENT DOCUMENTS

| | | | |
|---|---|---|---|
| 3,538,785 A * | 11/1970 | Grancon | 74/492 |
| 5,722,300 A | 3/1998 | Burkhard et al. | |
| 6,227,715 B1 | 5/2001 | Erhardt et al. | |
| 6,343,993 B1 | 2/2002 | Duval et al. | |
| 6,533,459 B2 | 3/2003 | Podhajecki et al. | |
| 6,942,417 B2 | 9/2005 | Schwarzbich | |
| 6,948,401 B2 | 9/2005 | Zernickel et al. | |
| 2004/0026196 A1 * | 2/2004 | Huisman | 188/322.16 |
| 2006/0131864 A1 * | 6/2006 | Riefe et al. | 280/775 |

\* cited by examiner

*Primary Examiner*—Paul N Dickson
*Assistant Examiner*—Keith Frisby
(74) *Attorney, Agent, or Firm*—Cantor Colburn LLP

(57) ABSTRACT

A steering column assembly includes an upper jacket and a lower jacket partially disposed within said upper jacket. A bushing is disposed between the upper jacket and the lower jacket. The upper jacket and the lower jacket are collapsible along a longitudinal axis in response to a collision event. A first roller mechanism and a second roller mechanism are mounted to the upper jacket near a forward end and a rearward end of the bushing respectively for engaging the lower jacket in rolling engagement. The first and second roller mechanisms resist a resultant force caused by a bending moment created by a transverse load applied to a distal end of the upper jacket to minimize an increase in a sliding frictional force between the bushing and the lower jacket.

19 Claims, 4 Drawing Sheets

COLLAPSIBLE STEERING COLUMN ASSEMBLY

BACKGROUND OF THE INVENTION

1. Field of the Invention

The subject invention relates generally to a steering column assembly for a vehicle, and more specifically to a steering column assembly collapsible along a longitudinal axis in response to a collision event.

2. Description of the Prior Art

Automotive steering column assemblies are typically equipped with kinetic energy absorption devices. The energy absorption devices reduce injury to a vehicle operator caused by the operator impacting a steering wheel as a result of a collision event. Such impacts during vehicle collision typically cause the steering column assemblies to collapse. The energy absorption devices absorb the energy transmitted through the steering column assembly as the steering column assembly collapses.

Such energy absorbing steering columns generally include a lower jacket disposed within an upper jacket. A bushing is disposed between the upper jacket and the lower jacket to de-lash the steering column assembly, with the bushing being coupled to the upper jacket. The upper jacket and the bushing translate linearly through a collapse stroke during the collision event. A load, i.e. a force, generated by the driver impacting the steering wheel initiates the collapse stroke. The steering wheel housing moves against a resisting or reactive force that may be produced by the energy absorption device designed to convert a portion of the driver's kinetic energy into work. The resisting force may be generated by systems including a plastically deformable metal element that is a part of the energy absorbing device.

During the collision event, the load is applied to the steering column assembly, with a horizontal component of the load being applied longitudinally to the steering column assembly and a vertical component of the load being applied vertically to the steering column assembly, i.e., transverse to the steering column assembly. The vertical component of the load creates a bending moment in the upper jacket, which is transferred to the lower jacket by the bushing. Accordingly, a resultant force is created between the upper jacket and the lower jacket to resist the bending moment. Typically, a first resultant force is located near a forward end (nearer the front of the vehicle) of the bushing and is directed downward, and a second resultant force is located near a rearward end (nearer the rear of the vehicle) of the bushing and is directed upward. The first resultant force and the second resultant force increase the frictional sliding force between the bushing and the lower jacket as the upper jacket and the bushing slide relative to the lower jacket during the collision event. The increased frictional sliding force negatively affects the performance of the energy absorption device.

SUMMARY OF THE INVENTION AND ADVANTAGES

The subject invention provides a steering column assembly for a vehicle. The steering column assembly comprises an upper jacket. The upper jacket defines an interior and extends along a longitudinal axis. A lower jacket is partially disposed within the interior. The lower jacket extends along the longitudinal axis. The upper jacket is moveable along the longitudinal axis relative to the lower jacket. A bushing is disposed between the upper jacket and the lower jacket. The bushing includes a forward edge and a rearward edge spaced from the forward edge along the longitudinal axis. A roller mechanism is coupled to the upper jacket. The roller mechanism includes a roller continuously engaging the lower jacket in rolling engagement. The roller is disposed adjacent one of the forward edge and the rearward edge of the bushing. The roller resists a resultant force transmitted between the upper jacket and the lower jacket in response to a load applied to the upper jacket transverse to the longitudinal axis. The roller minimizes an increase in sliding friction between the bushing and the lower jacket in response to the resultant force.

Accordingly, the roller mechanism reacts against the resultant force occurring between the upper jacket and the lower jacket as a result of the bending moment created by the transverse load applied to the upper jacket. The roller minimizes any increase in the sliding frictional force between the bushing and the lower jacket caused by the resultant force so that an energy absorption device may function properly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
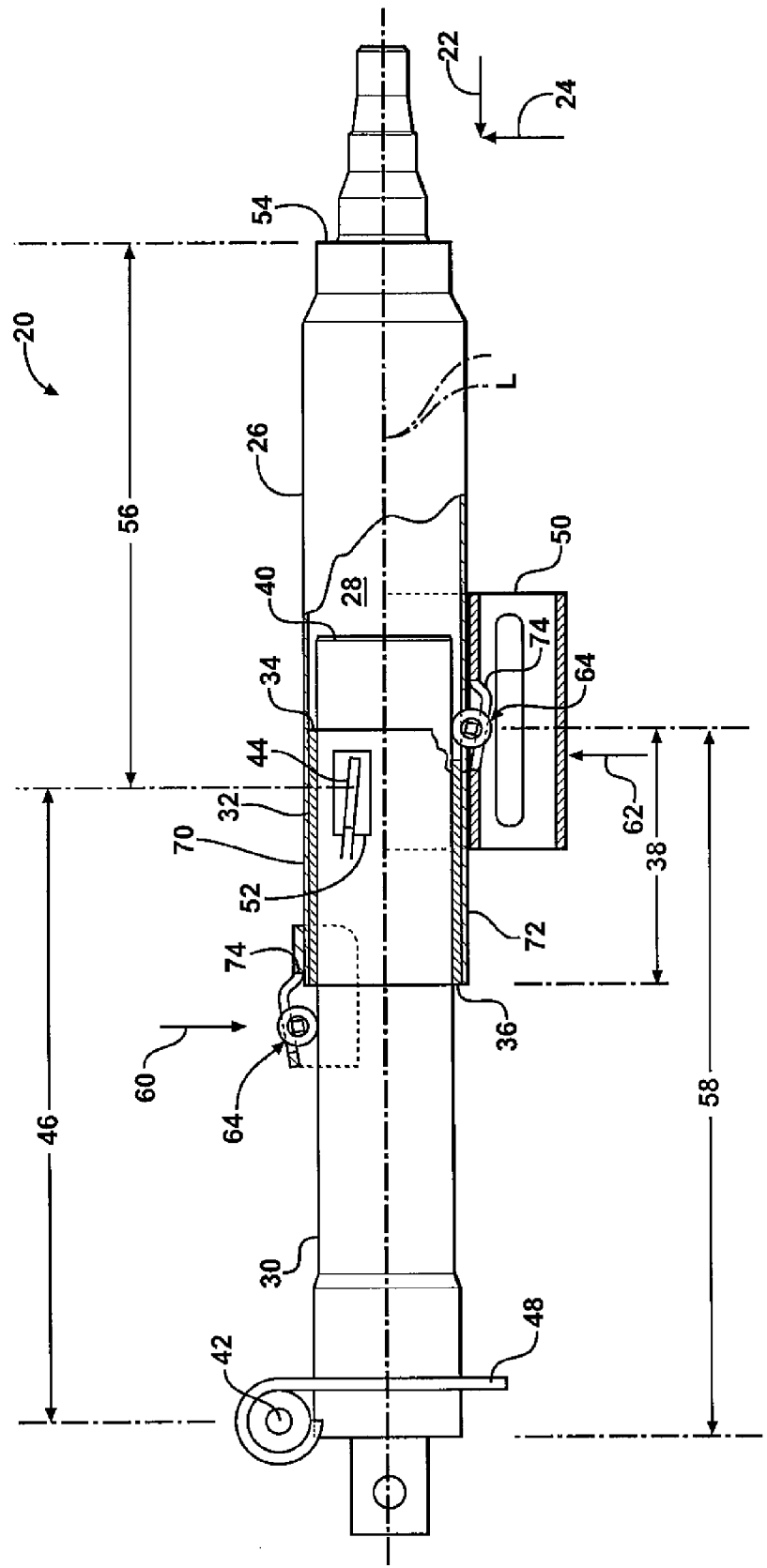
FIG. 1 is a schematic force diagram of a steering column assembly.

Referring to the Figures, wherein like numerals indicate corresponding parts throughout the several views, a steering column assembly is shown generally at 20. The steering column assembly 20 is for a vehicle and rotatably supports a steering wheel (not shown) as is well known. Referring to FIG. 1, the steering column assembly 20 is collapsible along a longitudinal axis L in response to a driver impacting the steering wheel during a collision event. The impact of the driver against the steering wheel transmits a load, i.e., a force, to the steering column to initiate the collapse stroke. The load applied to the steering column assembly 20 includes a longitudinal component 22 FL along the longitudinal axis L and a vertical component 24 transverse to the longitudinal axis L. The steering column assembly 20 includes an energy absorption device (not shown) for resisting the collapse stroke as is well known.

Figure 2:
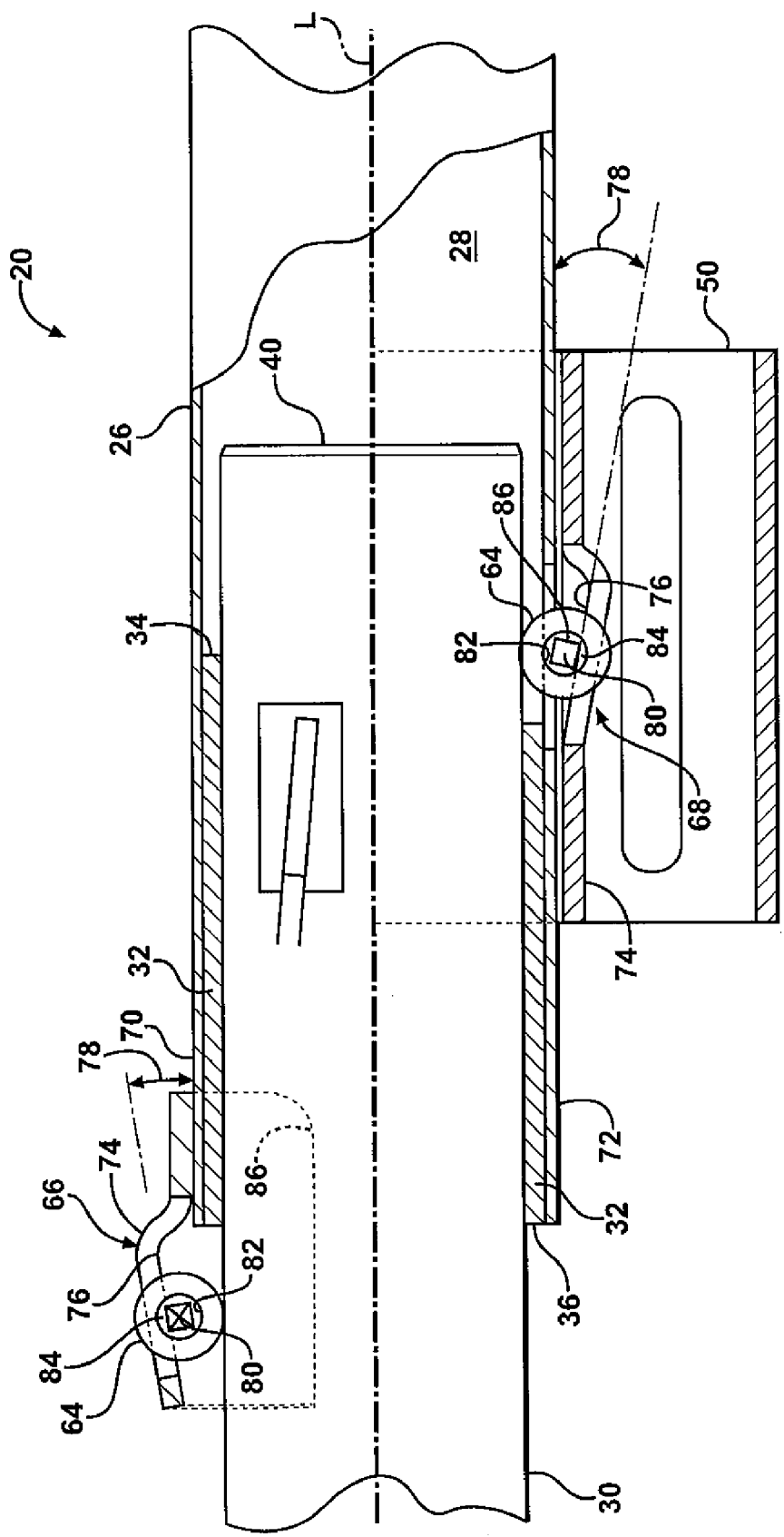
FIG. 2 is side plan view of the steering column assembly.

Referring to FIG. 2, the steering column assembly 20 comprises an upper jacket 26. The upper jacket 26 defines an interior 28, and extends along the longitudinal axis L. A lower jacket 30 is partially disposed within the interior 28 of the upper jacket 26. The lower jacket 30 also extends along the longitudinal axis L. The upper jacket 26 is moveable along the longitudinal axis L relative to the lower jacket 30 during the collapse stroke. While the steering column assembly 20 of the subject invention is described and shown as including the upper jacket 26 defining the interior 28 with the lower jacket 30 partially disposed therein, it should be appreciated that the configuration of the upper jacket 26 and the lower jacket 30 may be reversed and still fall within the scope of the subject invention. In other words, the lower jacket 30 may define the interior 28 and the upper jacket 26 may be partially disposed within the interior 28.

A bushing 32 is disposed between the upper jacket 26 and the lower jacket 30. Preferably, the bushing 32 is injection molded into place between the upper jacket 26 and the lower jacket 30. However, it should be appreciated that the bushing 32 may be manufactured and installed in some other manner. Preferably, the bushing 32 is coupled to and moveable with the upper jacket 26 along the longitudinal axis L. However, it should be appreciated that the bushing 32 may be coupled to the lower jacket 30, with the upper jacket 26 moveable relative to both the bushing 32 and the lower jacket 30 during the collapse stroke. The bushing 32 includes a forward edge 36 and a rearward edge 34. The forward edge 36 is disposed nearer the front of the vehicle, while the rearward edge 34 is disposed nearer the rear of the vehicle. The rearward edge 34 is spaced from the forward edge 36 a bushing length 38 along the longitudinal axis L. The bushing length 38 extends between the forward edge 36 and the rearward edge 34 of the bushing 32 along the longitudinal axis L.

The lower jacket 30 includes a rearward end 40 and a forward end opposite the rearward end along said longitudinal axis. The rearward end 40 of the lower jacket 30 is disposed nearer the rear of the vehicle. At least one mounting bracket is coupled to the lower jacket 30 at a first attachment point 42 adjacent the forward end of the lower jacket 30.

The mounting bracket is configured for attachment to the vehicle and may be configured and attached to the vehicle in any suitable manner. The upper jacket 26 is coupled to the at least one mounting bracket at a second attachment point 44. The second attachment point 44 is axially spaced from the first attachment point 42 a pre-determined first distance 46. Preferably, the at least one mounting bracket includes a first mounting bracket 48 and a second mounting bracket 50, with the first mounting bracket 48 coupled to the lower jacket 30 adjacent to the forward end of the lower jacket 30 at the first attachment point 42 and the second mounting bracket 50 coupled to the upper jacket 26 at the second attachment point 44.

A release module 52 releasably attaches the second mounting bracket 50 to the vehicle prior to a collision event. The release module 52 releases the second mounting bracket 50 from the vehicle in response to the collision event. Accordingly, the release module 52 interconnects the vehicle and the second mounting bracket 50 at the second attachment point 44.

The upper jacket 26 includes a distal end 54. The distal end 54 of the upper jacket 26 is disposed nearer the rear of the vehicle, with the steering wheel attached to the distal end 54 as is well known. The distal end 54 of the upper jacket 26 is axially spaced from the second attachment point 44 along the longitudinal axis L a pre-determined second distance 56. The rearward edge 34 of the bushing 32 is spaced from the first attachment point 42 a pre-determined third distance 58.

Referring back to FIG. 1, the vertical component 24 of the load applied to the steering column assembly 20 by the driver during the collision event produces a bending moment in the upper jacket 26. The bending moment creates a first resultant force 60 near the forward edge 36 of the bushing on a top side of the steering column assembly 20, and a second resultant force 62 near the rearward edge 34 of the bushing 32 on a bottom side of the steering column assembly 20. In order to resist the first resultant force 60 and the second resultant force 62, the steering column assembly 20 of the subject invention disposes a roller mechanism 66, 68 near at least one of the first resultant force 60 and the second resultant force 62.

Referring back to FIG. 2, the roller mechanism 66, 68 is coupled to the upper jacket 26. The roller mechanism 66, 68 includes a roller 64, with the roller 64 continuously engaging the lower jacket 30 in rolling engagement. The roller 64 engages the lower jacket 30 adjacent one of the forward edge 36 and the rearward edge 34 of the bushing 32. The roller 64 resists one of the resultant forces 60, 62 transmitted between the upper jacket 26 and the lower jacket 30 in response to the vertical component 24 of the load applied to the upper jacket 26 transverse to the longitudinal axis L. By resisting the resultant forces 60, 62, the roller 64 minimizes an increase in sliding friction between the bushing 32 and the lower jacket 30 in response to the resultant force, thereby improving performance of the energy absorption device by eliminating or minimizing the frictional sliding loads generated by the first resultant force 60 and the second resultant force 62.

Preferably, the roller mechanism 66, 68 includes a first roller mechanism 66 and a second roller mechanism 68. The first roller mechanism 66 is disposed adjacent to the forward edge 36 of the bushing 32 near the first resultant force 60. The second roller mechanism 68 is disposed adjacent to the rearward edge 34 of the bushing 32 near the second resultant force 62. The first roller mechanism 66 and the second roller mechanism 68 are vertically disposed on opposite sides 70, 72 of the tipper column jacket. Accordingly, it should be appreciated that the upper column jacket includes an upper side 70 and a lower side 72. The lower side 72 of the upper jacket 26 is disposed vertically below the upper side 70. The first roller mechanism 66 is disposed on the upper side 70 of the upper jacket 26, and the second roller mechanism 68 is disposed on the lower side 72 of the upper jacket 26.

The roller mechanism 66, 68 includes a roller bracket 74 mounted to the upper jacket 26. The roller bracket 74 may be configured in any suitable manner, but must be rigidly attached to the upper jacket 26 to be able to transmit vertical loads to the upper jacket 26. The roller bracket 74 includes a ramp 76 defining an inclined angle 78 relative to the lower jacket 30. The inclined angle 78 is between the range of four degrees (4°) and five degrees (5°) relative to the lower jacket 30.

The roller mechanism 66, 68 includes an axle 80 coupled to the roller bracket 74. The axle 80 is in engagement with the ramp 76. Accordingly, the roller 64 includes a central bore 82. The axle 80 extends through the central bore 82, with the axle 80 rotatably supporting the roller 64. The axle 80 includes a planar surface 84 abutting the ramp 76. Preferably, the axle 80 includes a square cross section; however, it should be appreciated that the cross section of the axle 80 may be other than square so long as the cross section presents a planar surface 84 to abut the ramp 76.

The planar surface 84 reacts against the ramp 76 disposed at the inclined angle 78 relative to the lower jacket 30 and prevents the axle 80 from rotating. The force of gravity causes the roller 64 to seat against the lower jacket 30 and the planar surface 84 of the axle 80 to wedge against the ramp 76, thereby de-lashing the roller mechanism 66, 68 and removing all clearance between the lower jacket 30 and the roller mechanism 66, 68.

Upon the driver impacting the steering wheel during the collision event, the first resultant force 60 and the second resultant force 62 react against the first roller mechanism 66 and the second roller mechanism 68 respectively. The rollers 64 of the first roller mechanism 66 and the second roller mechanism 68 roll on an outside surface of the lower jacket 30 and minimize or eliminate the frictional sliding load that would otherwise be generated by the bending moment created by the vertical component 24 of the impact load. The inclined angle 78 of the ramp 76 is slight enough to prevent the axle 80 from climbing the ramp 76 in response to the first resultant force 60 and the second resultant force 62.

Figure 3:
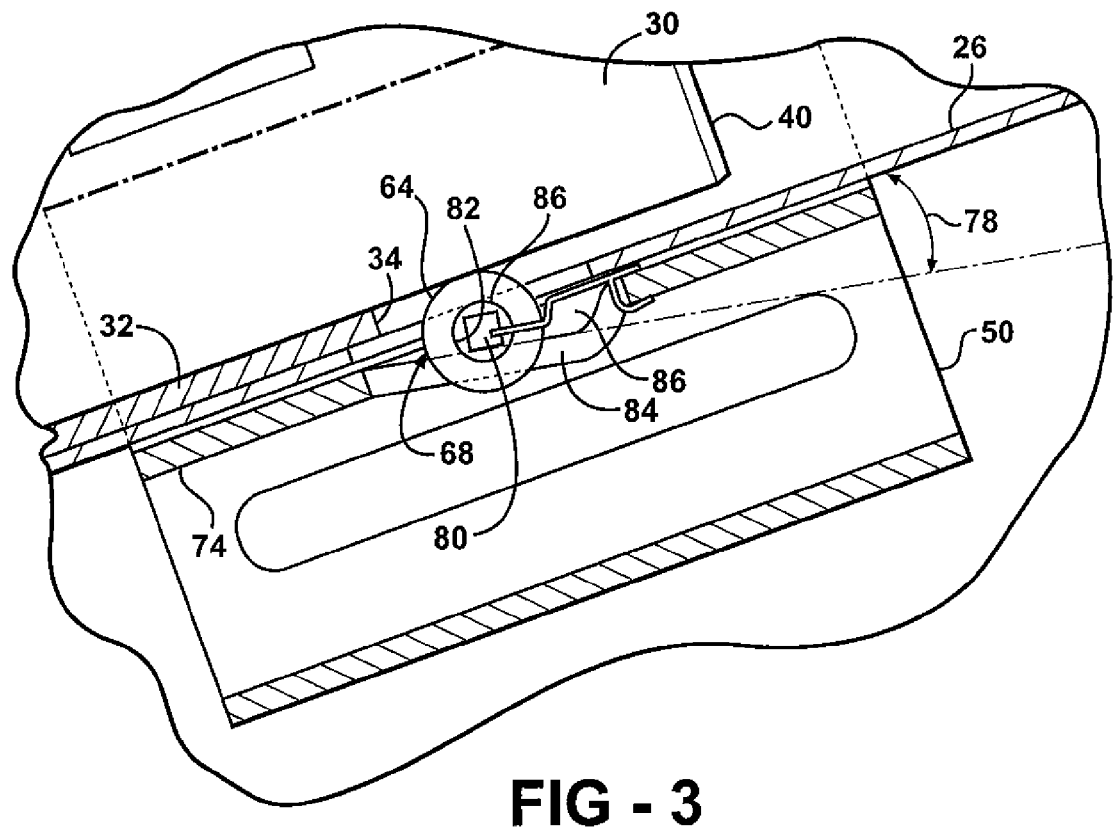
FIG. 3 is an enlarged fragmentary side plan view of the steering column assembly.
Figure 4:
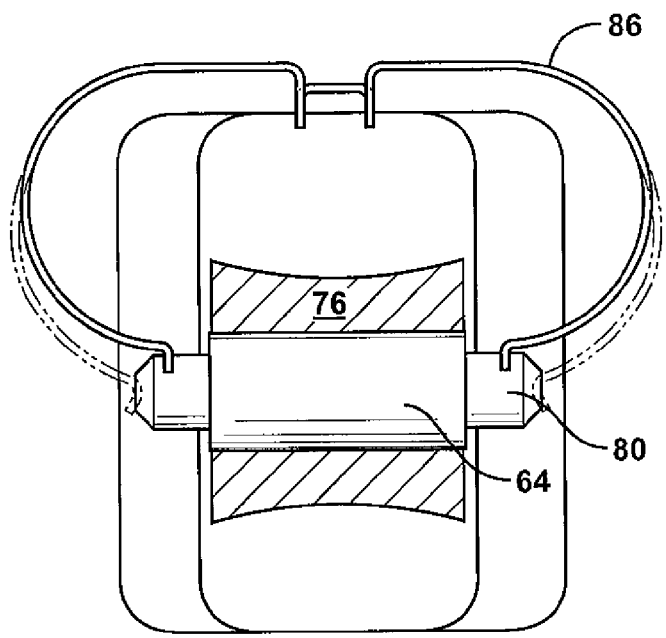
FIG. 4 is an enlarged fragmentary bottom plan view of the steering column assembly shown in FIG. 3.

Referring to FIGS. 3 and 4, the roller mechanism 66, 68 may include a spring 86. The spring 86 interconnects the axle 80 and the roller bracket 14. The spring 86 urges the axle 80 into engagement with the ramp 76 and urges the roller 64 into engagement with the lower jacket 30. As shown, the spring 86 includes a formed bar spring 86 interconnecting the axle 80 and the roller bracket 74. However, it should be appreciated that the spring 86 may include some other style of spring 86 and may be configured other than shown and described herein.

Figure 5:
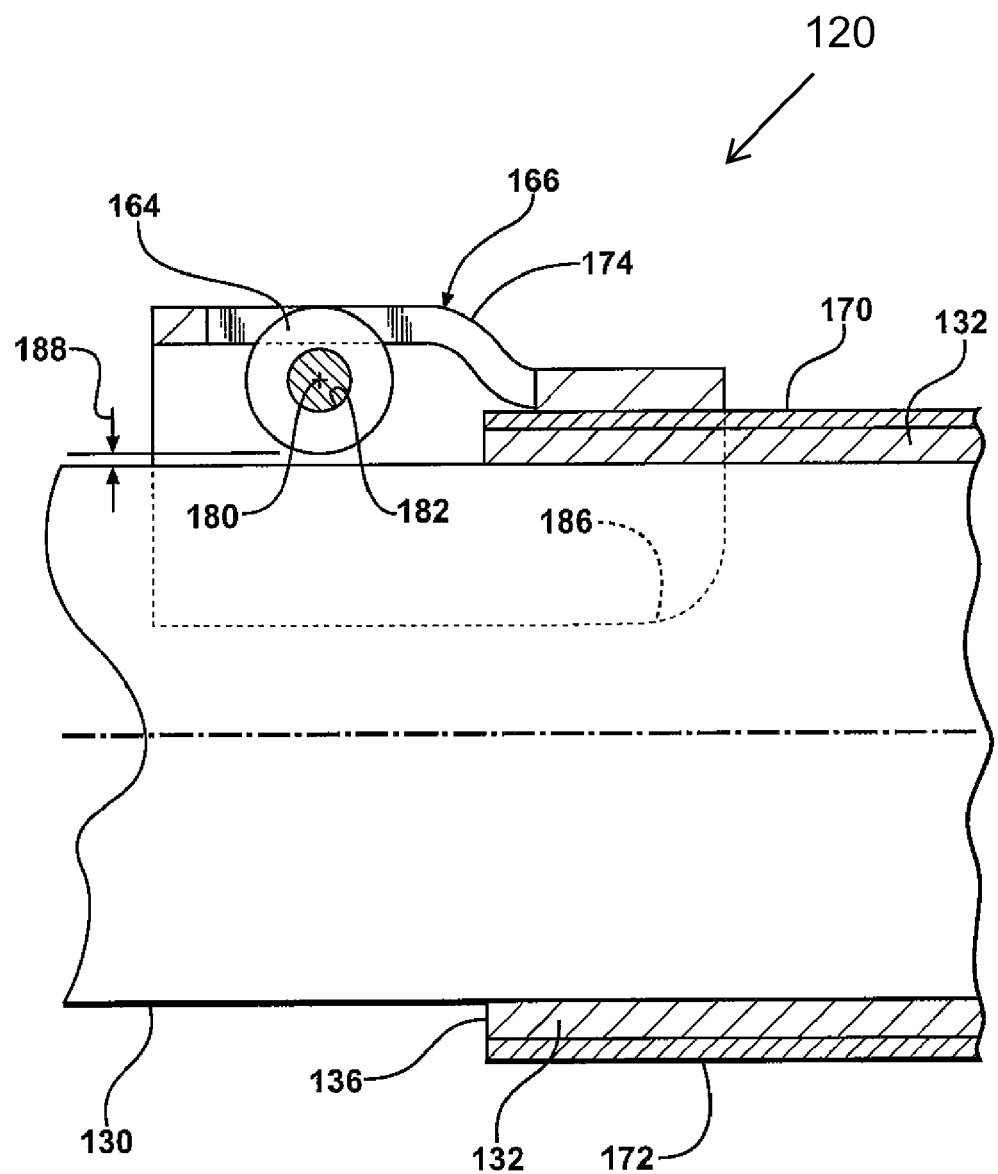
FIG. 5 is a fragmentary side plan view of an alternative embodiment of the steering column assembly.

Referring to FIG. 5, an alternative embodiment of the steering column assembly is shown generally at 120. Features of the alternative embodiment of the steering column assembly 120 similar to features of the steering column assembly 20 are referenced utilizing the identical reference numeral utilized for the steering column assembly 20 preceded by the numeral 1. For example, the steering column assembly 20 includes the roller 64, accordingly the alternative embodiment of the steering column assembly 120 utilizes the reference numeral 164 to identify the roller 164 in the alternative embodiment of the steering column assembly 120.

In the alternative embodiment of the steering column assembly 120, the axle 180 includes a circular cross section and is rotatably supported by the roller bracket 174, i.e., the axle 180 is rotatably fixed to the roller bracket 174. The axle 180 supports the roller 164 in spaced relationship relative to the lower jacket 130. Accordingly, the roller 164 and the lower jacket 130 define a separation distance 188 therebetween during normal operating conditions. However, the spaced relationship is very minimal. Accordingly, the roller 164 will be brought into contact with the lower jacket 130 in response to minimal flexure of the steering column assembly 120 as the vertical component 124 of the load creates a bending moment in the steering column assembly 120. It should be noted that the alternative embodiment of the steering column assembly 120 does not include the angled ramp 176 to ensure that the roller 164 engages the lower jacket 130 at all times.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
   an upper jacket defining an interior and extending along a longitudinal axis;
   a lower jacket partially disposed within said interior and extending along said longitudinal axis with said upper jacket moveable along said longitudinal axis relative to said lower jacket;
   a bushing disposed between said upper jacket and said lower jacket with said bushing including a forward edge and a rearward edge spaced from said forward edge along said longitudinal axis;
   a first roller mechanism adjacent the forward edge of said bushing, said first roller mechanism rigidly coupled to said upper jacket and including a roller continuously engaging said lower jacket in rolling engagement adjacent said forward edge of said bushing for resisting a resultant force transmitted between said upper jacket and said lower jacket in response to a load applied to said upper jacket transverse to said longitudinal axis to minimize an increase in sliding friction between said bushing and said lower jacket in response to said resultant force; and
   a second roller mechanism adjacent the rearward edge of said bushing, said second roller mechanism rigidly coupled to said upper jacket and including a roller continuously engaging said lower jacket in rolling engagement adjacent said rearward edge of said bushing for resisting a resultant force transmitted between said upper jacket and said lower jacket in response to a load applied to said upper jacket transverse to said longitudinal axis to minimize an increase in sliding friction between said bushing and said lower jacket in response to said resultant force.

2. An assembly as set forth in claim 1 wherein said first roller mechanism and said second roller mechanism are vertically disposed on opposite sides of said upper jacket.

3. An assembly as set forth in claim 2 wherein said upper jacket includes an upper side and a lower side disposed vertically below said upper side with said first roller mechanism being disposed on said upper side and said second roller mechanism being disposed on said lower side.

4. An assembly as set forth in claim 1 wherein each of said roller mechanisms includes a roller bracket mounted to said upper jacket.

5. An assembly as set forth in claim 4 wherein each of said roller mechanisms includes an axle rotatably supported by said roller bracket.

6. An assembly as set forth in claim 5 wherein each of said rollers includes a central bore with said axle extending through said central bore to rotatably support said roller.

7. An assembly as set forth in claim 1 wherein said lower jacket includes a forward end and wherein said assembly further comprises at least one mounting bracket coupled to said lower jacket at a first attachment point adjacent said forward end and configured for attachment to the vehicle.

8. An assembly as set forth in claim 7 wherein said upper jacket is coupled to said at least one mounting bracket at a second attachment point axially spaced from said first attachment point a pre-determined first distance.

9. An assembly as set forth in claim 8 wherein said upper jacket includes a distal end axially spaced from said second attachment point along said longitudinal axis a pre-determined second distance.

10. An assembly as set forth in claim 8 wherein said at least one mounting bracket includes a first mounting bracket coupled to said lower jacket adjacent said forward end of said lower jacket at said first attachment point and a second mounting bracket coupled to said upper jacket at said second attachment point.

11. A steering column assembly for a vehicle, said assembly comprising:
    an upper jacket defining an interior and extending along a longitudinal axis;
    a lower jacket partially disposed within said interior and extending along said longitudinal axis with said upper jacket moveable along said longitudinal axis relative to said lower jacket;
    a bushing disposed between said upper jacket and said lower jacket with said bushing including a forward edge and a rearward edge spaced from said forward edge along said longitudinal axis; and a roller mechanism coupled to said upper jacket and including a roller continuously engaging said lower jacket in rolling engagement adjacent one of said forward edge and said rearward edge of said bushing for resisting a resultant force transmitted between said upper jacket and said lower jacket in response to a load applied to said upper jacket transverse to said longitudinal axis to minimize an increase in sliding friction between said bushing and said lower jacket in response to said resultant force, said roller mechanism including a roller bracket mounted to said upper jacket and said roller bracket including a ramp defining an inclined angle relative to said lower jacket.

12. An assembly as set forth in claim 11 wherein said inclined angle is between the range of four degrees (4°) and five degrees (5°).

13. An assembly as set forth in claim 11 wherein said roller mechanism includes an axle coupled to said roller bracket and engaging said ramp.

14. An assembly as set forth in claim 13 wherein said roller includes a central bore with said axle extending through said central bore to rotatably support said roller.

15. An assembly as set forth in claim 13 wherein said axle includes a planar surface abutting said ramp.

16. An assembly as set forth in claim 8 wherein said roller mechanism includes a spring interconnecting said axle and said roller bracket to urge said axle into engagement with said ramp and urge said roller into engagement with said lower jacket.

17. An assembly as set forth in claim 6 wherein said roller mechanism includes a first roller mechanism disposed adjacent said forward edge of said bushing and a second roller mechanism disposed adjacent said rearward edge of said bushing.

18. An assembly as set forth in claim 17 wherein said rearward edge of said bushing is spaced from said first attachment point a pre-determined third distance.

19. An assembly as set forth in claim 18 wherein said bushing is coupled to and moveable with said upper jacket along said longitudinal axis.

* * * * *